Jan. 28, 1969　　　R. M. HORVATH　　　3,425,045
METHOD TO ACHIEVE THE LOGICAL EXCLUSIVE OR AND
EQUALITY FUNCTIONS WITH CROSS-FIELD SWITCHING
Filed Sept. 22, 1964

INVENTOR.
ROBERT M. HORVATH

BY

ATTORNEY

United States Patent Office 3,425,045
Patented Jan. 28, 1969

3,425,045
METHOD TO ACHIEVE THE LOGICAL EXCLUSIVE OR AND EQUALITY FUNCTIONS WITH CROSS-FIELD SWITCHING
Robert M. Horvath, Munroe Falls, Ohio, assignor to Goodyear Aerospace Corporation, Akron, Ohio, a corporation of Delaware
Filed Sept. 22, 1964, Ser. No. 398,317
U.S. Cl. 340—174   5 Claims
Int. Cl. G11b 5/02

ABSTRACT OF THE DISCLOSURE

This invention relates to a method for achieving the logical Exclusive OR and Equality functions with a non-destructive readout of a single aperture memory storage element utilizing cross-field switching techniques, and is particularly characterized by the utilization of a ramped interrogation pulse to obtain the logical functions.

---

Heretofore, the use of standard toroidal cores in digital memory storage systems has been well known. Further, the technique of cross-field switching to achieve a non-destructive readout of the information stored in the core has been well known. However, these prior art techniques have not been able to achieve the Exclusive OR or Equality logical functions in a non-destructive manner, utilizing the conventional cross-field switching techniques. A patent application entitled, "Externally Biased High Speed Non-Destructive Memory Element Adapted for Associative Memory," filed Sept. 23, 1964, with Ser. No. 398,627, also assigned to Goodyear Aerospace Corporation illustrates a method to achieve the Exclusive OR function with cross-field switching techniques utilizing an external magnetic bias. A successful system utilizing substantially conventional cross-field switching techniques to achieve an Exclusive OR or Equality function, and which can achieve a sufficient signal output with a high signal to noise ratio is needed by the art.

It is the general object of the present invention to avoid and overcome the foregoing and other objections of prior art practices, and to meet the needs of the art by providing a method to achieve a non-destructive Exclusive OR function from a single aperture magnetic storage element utilizing cross-field switching techniques where the cross-field magnetic pulse is ramped so the sensed output signal can be interrogated with respect to the unknown information stored as a flux pattern in the core.

A further object of the invention is to provide a simple method to achieve the Exclusive OR or Equality functions from a single apertured core utilizing cross-field switching techniques by utilizing a ramp pulsed magnetic field perpendicular to the axis of the aperture of the core and sensing flux changes in a portion of the core perpendicular to the ramp pulsed magnetic field.

The aforesaid objects of the invention and other objects which will become apparent as the description proceeds are achieved by providing a method to non-destructively achieve the Exclusive OR logical function from a single aperture magnetic permeable core which includes the steps of inducing a flux pattern in a predetermined direction around the aperture of the core to represent an unknown bit of information, surrounding the core with a ramp pulsed magnetic field in a known direction and configuration of ramp substantially perpendicular to the axis of the aperture of the core, and sensing the direction and amount of flux change in a portion of the core substantially perpendicular to the ramp pulsed magnetic field during the duration of the ramp pulsed magnetic field.

For a better understanding of the invention reference should be had to the accompanying drawings, wherein.

Figure 1:
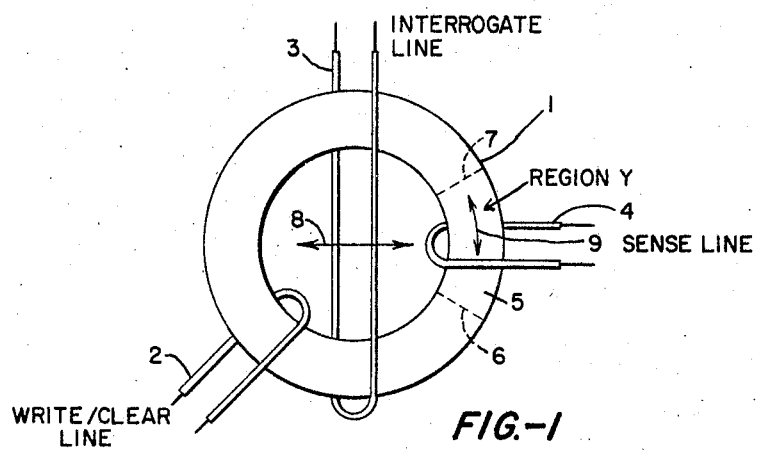
FIGURE 1 is a schematic illustration of a single aperture toroidal core which has the necessary windings positioned in proper relationship thereon to achieve the Exclusive OR and Equality logical functions utilizing cross-field switching techniques.

With reference to the form of the invention illustrated in FIGURE 1 of the drawings, a single aperture toroidal core 1 is illustrated with a write/clear line 2 passed through the aperture of the core, an interrogate line 3 surrounding the core in a solenoidal fashion, and a sense line 4 passed through the core in a position substantially perpedicular to the interrogate line 3.

In order to more clearly determine the flux changes induced upon a signal pulse through the interrogate line 3, we should consider only the flux paths through an area called region Y, and indicated by numeral 5, as defined by the dotted lines 6 and 7. This region Y encompasses equal areas on both sides of the sense winding 4, or defines an area of the core 1 essentially perpendicular to the magnetic field generated by a current pulse passed through the interrogate line 3. In other words, the sense line 4 is interested in determining the flux change in an arcuate section of the core which is substantially perpendicular to the magnetic field generated by the interrogate line 3. Thus, a determination of the flux changes in region Y will determine what type of information will be detected by the sense line 4. It should be understood that the magnetic field generated by a current pulse passed through the interrogate line 3 will be in either direction indicated by the double ended arrow 8, whereas the flux path around the aperture of the core 1 in region Y will usually be substantially in a direction indicated by the double ended arrow 9.

Figure 2:
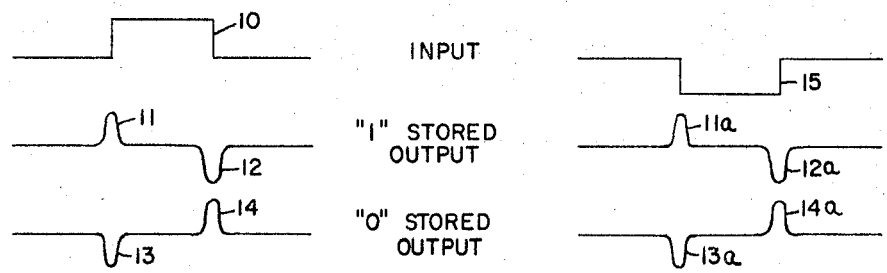
FIGURE 2 is a graphic illustration of the type of readout obtained from the core of FIGURE 1 utilizing conventional cross-field switching techniques.

Now, with reference to FIGURE 2 the direction of flux change in the region Y will be investigated. First, let us consider a square input current pulse 10 applied through the interrogate line 3 of FIGURE 1. If the flux patterns stored in the core 1 is, for example, in a clockwise direction, it might indicate a ONE stored in memory. In this case, the magnetic field generated by the input current pulse 10 will cause a flux deflection in region Y in an upward direction indicated by a raised portion 11 when the pulse is applied, which shifts back again in a downward direction indicated by a downward portion 12 when the current pulse 10 is terminated. If a ZERO is stored in the core 1, for example, represented by a counter-clockwise flux pattern, the results of the current pulse 10 will be exactly opposite, as indicated by the downward pulse 13 and the upward pulse 14 at the start and completion of the current pulse 10.

If the current pulse is in an opposite sense, as indicated by the downward pulse 15 on the right side of FIGURE 2, the flux direction change detected by the sense winding 4 will still be in the same sense, as indicated by the portions 11a and 12a for a ONE stored in the core 1, and a downward and upward direction indicated by portions 13a and 14a for a ZERO stored in the core 1. Thus, there cannot be any sense or logic determined from this approach since the same result is achieved from the core with the cross-field switching technique regardless of the direction of the current pulse through the interrogate line 3. This is the result in a conventional cross-field switching technique. The magnetic field generated by passing the current pulses through the interrogate line 3 will not be sufficient to cause any permanent flux change in the core 1. It is only the temporary flux change in region Y which is measured by the sense line 4.

Figure 3:
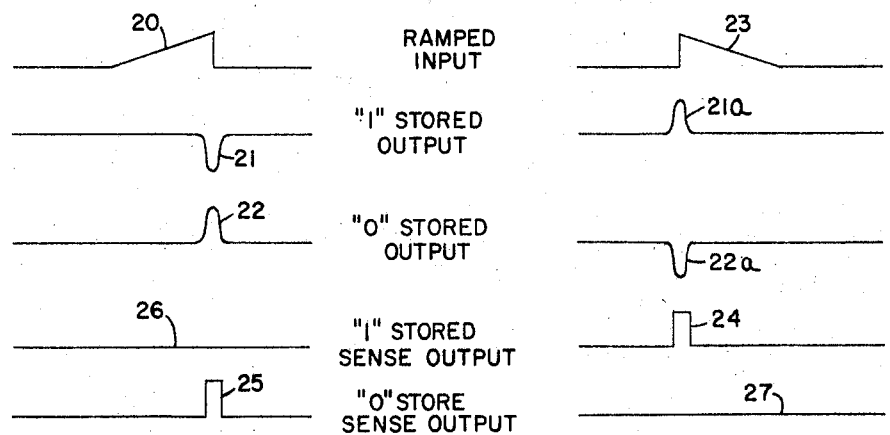
FIGURE 3 is a graphic illustration of how the Exclusive OR and Equality logical functions may be achieved from the core of FIGURE 1 utilizing a ramp pulsed cross-field switching technique.

A logical sense and valuable information can be achieved from the cross-field switching technique when the input current is a ramped pulse, as indicated by the numeral 20 in FIGURE 3. The pulse 20 is ramped from a low value at the left to a high value at the right which means that the flux change in the core will only take place when the value reaches a high enough level and is rapidly cut off giving only a downward pulse 21 for a ONE stored in the core, and an upward pulse 22 for a ZERO stored in the core. Conversely, an opposite ramped pulse 23 is indicated on the right hand side of FIGURE 3 which results in signals only at the start of the pulse, which signals will be in an opposite direction, as indicated from FIGURE 2, so that a raised pulse 21a is indicated for a ONE stored in the core and a downward pulse 22a is indicated for a ZERO stored in the core.

If the sense line 4 is set only to record flux deflections in an up direction, a response will be indicated for a ONE when the ramped input signal is at a peak value initially, like the signal 23, as indicated by the pulse 24 on the right hand side of FIGURE 3. Likewise, an output for a ZERO stored in the core, indicated by the up pulse 25 on the sense winding, will only occur when the ramped input starts from the small value and increases to the peak value as indicated by the pulse 20 on the left side of FIGURE 3. The lines 26 and 27 represent no change on the sense line 4. Again, it should be understood that the ramp pulse will not be sufficient to cause any permanent changes in the flux pattern stored in the core.

In order to understand how the Exclusive OR or Equality functions are achieved, we might consider a ONE stored in the core 1 as B information and a ZERO stored in the core 1 as $\overline{B}$ information. Then, the ramped pulse 20 might be considered as A information and the ramped pulse 23 as $\overline{A}$ information. Therefore, it can readily be seen that output pulses are only obtained when either A and $\overline{B}$ information or $\overline{A}$ and B information are present in the core 1. Obviously, this relationship could be changed to $A+B$ or $\overline{A}+\overline{B}$ if the indicated representation of the ramped input signals were reversed.

Thus, it should be seen that the Exclusive OR or Equality functions are obtained using cross-field switching techniques where a ramped input current pulse is passed through the interrogate line to create a ramped interrogate field so that only one input is sensed by the sense line. This is a simple, highly effective, and inexpensive way to obtain the Exclusive OR or Equality functions from a single aperture magnetic permeable memory storage element. It utilizes the advantages achieved utilizing cross-field switching techniques, as well as providing the highly desirable Exclusive OR or Equality logical functions in a non-destructive readout mode which can be used for associative memory operation. Thus, the objects of the invention have been achieved.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A method to non-destructively achieve the Exclusive OR logical function from a single aperture ferrite core which includes the steps of inducing a flux pattern in a predetermined direction around the aperture of the core to represent an unknown bit of information, surrounding the core with a ramp pulsed magnetic field in a known direction and configuration of ramp substantially perpendicular to the axis of the aperture of the core, and sensing the direction and amount of flux change in a portion of the core substantially perpendicular to the ramp pulsed magnetic field during the duration of said ramp pulsed magnetic field.

2. A method to non-destructively achieve the Exclusive OR logical function from a single aperture magnetic permeable core which includes the steps of inducing a flux pattern in a predetermined direction around the aperture of the core to represent an unknown B or $\overline{B}$ bit of information, surrounding the core with a ramp pulsed magnetic field in a known direction and configuration of ramp to represent A or $\overline{A}$ bit of information, said magnetic field being substantially perpendicular to the axis of the aperture of the core of a magnitude less than the threshold switching level thereof, and sensing the amount of flux change only in an up direction in a portion of the core substantially perpendicular to the ramp pulsed magnetic field during the duration of said ramp pulsed magnetic field whereby an upward flux change occurs when a B is stored in the core and $\overline{A}$ is represented by the ramp pulsed magnetic field, and when a $\overline{B}$ is stored in the core and A is represented by the ramp pulsed magnetic field.

3. A method to effect non-destructive readout of a single aperture magnetic core which comprises storing an unknown bit of information as a flux pattern around the aperture of the core, subjecting the core to a ramp pulsed magnetic field perpendicular to the axis of the aperture and of a known configuration, while simultaneously sensing the amount and direction of flux path change in a portion of the core substantially perpendicular to the direction of the ramp pulsed magnetic field.

4. A method to effect non-destructive readout of a single aperture magnetic permeable core which comprises storing a B bit of information as a flux pattern around the aperture of the core, subjecting the core to a ramp pulsed magnetic field which gradually builds to a peak level and then rapidly terminates to represent $\overline{A}$ information, said magnetic field being substantially perpendicular to the axis of the aperture of the core, and sensing the amount of flux change in a predetermined direction in a portion of the core substantially perpendicular to the direction of the ramp pulsed magnetic field.

5. A method according to claim 4 where the flux pattern in the core is opposite to represent $\overline{B}$ information, and the ramp pulsed magnetic field starts from zero, moves rapidly to a peak level and gradually diminishes to represent A information.

References Cited

UNITED STATES PATENTS 3,214,741  10/1965  Tillman _____ 340—174

TERRELL W. FEARS, *Primary Examiner.*

VINCENT P. CANNEY, *Assistant Examiner.*

U.S. Cl. X.R.

307—88